US006757417B2

(12) United States Patent
Licato et al.

(10) Patent No.: US 6,757,417 B2
(45) Date of Patent: Jun. 29, 2004

(54) METHOD AND APPARATUS FOR DEFINING A THREE-DIMENSIONAL IMAGING SECTION

(75) Inventors: Paul E. Licato, Wauwatosa, WI (US); James Kevin DeMarco, East Brunswick, NJ (US)

(73) Assignee: GE Medical Systems Global Technology Company, LLC, Waukesha, WI (US)

( * ) Notice: Subject to any disclaimer, the term of this patent is extended or adjusted under 35 U.S.C. 154(b) by 485 days.

(21) Appl. No.: 09/748,962

(22) Filed: Dec. 27, 2000

(65) Prior Publication Data

US 2002/0081009 A1 Jun. 27, 2002

(51) Int. Cl.[7] .................................................. G06K 9/00
(52) U.S. Cl. ....................... 382/131; 600/410; 600/411; 600/412
(58) Field of Search ................................ 382/128, 129, 382/130, 131, 132, 154, 164, 171, 173, 177, 179; 600/411, 412, 415, 440, 445, 473, 474, 410, 427; 378/21, 23, 25, 27, 37

(56) References Cited

U.S. PATENT DOCUMENTS

| | | | |
|---|---|---|---|
| 5,512,826 A | | 4/1996 | Hardy et al. |
| 5,512,827 A | | 4/1996 | Hardy et al. |
| 5,560,361 A | | 10/1996 | Glusick |
| 5,657,757 A | | 8/1997 | Hurd et al. |
| 5,711,300 A | | 1/1998 | Schneider et al. |
| 5,951,475 A | * | 9/1999 | Gueziec et al. ............. 600/425 |
| 6,128,522 A | * | 10/2000 | Acker et al. ................ 600/411 |
| 6,246,784 B1 | * | 6/2001 | Summers et al. ........... 382/128 |
| 6,275,035 B1 | * | 8/2001 | Debbins et al. ............. 324/307 |
| 6,408,201 B1 | * | 6/2002 | Foo et al. .................... 600/410 |
| 6,459,925 B1 | * | 10/2002 | Nields et al. ............... 600/427 |

OTHER PUBLICATIONS

"Cardiac Magnetic Resonance Fluoroscopy"; 8–pg. document; by Joseph P. Debbins et al., Magnetic Resonance in Medicine; vol. 38, pp. 588–595 (1996).
"Interactive Coronary MRI"; 7–pg. document; by Christopher J. Hardy et al.; Magnetic Resonance in Medicine; vol. 40, pp. 105–111 (1998).
"Interactive Selection of Optimal Section Orientations Using Real–Time MRI"; 6–pg. document; by Nicholas J. Hangiandreou et al.; Magnetic Resonance in Medicine; vol. 34, pp. 114–119 (1995).
"Interactive Three–Point Localization of Double–Oblique Sections Using MR Fluoroscopy"; 13–pg. document; by Reed F. Busse et al.; (Submission to: Magnetic Resonance in Medicine Jul. 17, 1998—from Magnetic Resonance Laboratory/Mayo Clinic/Rochester, MN).

* cited by examiner

Primary Examiner—Jayanti K. Patel
Assistant Examiner—Abolfazl Tabatabai
(74) Attorney, Agent, or Firm—Foley & Lardner LLP; Michael A. Della Penna; Peter J. Vogel

(57) ABSTRACT

A method of defining a three-dimensional imaging section which comprises displaying a plurality of localizer images of the structure of interest, acquiring operator inputs that designate regions on the plurality of localizer images and that correspond to regions within the structure of interest, and determining a volume based on the regions designated by the operator inputs. The volume defines the three-dimensional imaging section, which is a three-dimensional section of a structure of interest.

29 Claims, 9 Drawing Sheets

METHOD AND APPARATUS FOR DEFINING A THREE-DIMENSIONAL IMAGING SECTION

BACKGROUND OF THE INVENTION

This invention relates to three-dimensional imaging, and, more particularly, to a method and apparatus for defining a three-dimensional imaging section.

Three-dimensional imaging is commonly employed to allow an operator to obtain three-dimensional images that show the interior of a structure of interest. A common application of three-dimensional imaging is medical imaging, and a common technique for performing three-dimensional imaging, especially in the context of medical imaging, is magnetic resonance imaging.

Magnetic resonance imaging is one example of a variety of techniques used for medical imaging. When a substance such as human tissue is subjected to a uniform magnetic field (polarizing field $B_z$), the individual magnetic moments of the spins in the tissue attempt to align with this polarizing field, but precess about it in random order at their characteristic Larmor frequency. A net magnetic moment $M_z$ is produced in the direction of the polarizing field, but the randomly oriented magnetic components in the perpendicular, or transverse, plane (x-y plane) cancel one another. If, however, the substance, or tissue, is subjected to a magnetic field (excitation field $B_1$) which is in the x-y plane and which is near the Larmor frequency, the net aligned moment, $M_z$, may be rotated, or "tipped", into the x-y plane to produce a net transverse magnetic moment $M_1$, which is rotating, or spinning, in the x-y plane at the Larmor frequency. The degree to which the net magnetic moment $M_z$ is tipped, and hence the magnitude of the net transverse magnetic moment $M_1$ depends primarily on the length of time and the magnitude of the applied excitation field $B_1$. A signal is emitted by the excited spins, and after the excitation signal $B_1$ is terminated, this signal may be received and processed to form an image.

When utilizing MRI to produce images, a technique is employed to obtain MRI signals from specific locations in the subject. Typically, the region which is to be imaged is scanned by a sequence of MRI measurement cycles which vary according to the particular localization method being used. The resulting set of received MRI signals are digitized and processed to reconstruct the image using one of many well known reconstruction techniques. To perform such a scan, MRI signals are elicited from specific locations in the subject. This is accomplished by employing magnetic fields ($G_x$, $G_y$, and $G_z$) which have the same direction as the polarizing field $B_0$, but which have a gradient along the respective x, y and z axes. By controlling the strength of these gradients during each MRI cycle, the spatial distribution of spin excitation can be controlled and the location of the resulting MRI signals can be identified.

MRI data for constructing images can be collected using one of many available techniques, such as multiple angle projection reconstruction and Fourier transform (FT). Typically, such techniques comprise a pulse sequence made up of a plurality of sequentially implemented views. Each view may include one or more MRI experiments, each of which comprises at least an RF excitation pulse and a magnetic field gradient pulse to encode spatial information into the resulting MRI signal.

In order for an MRI system to acquire signals from a region of interest to an operator, the operator first defines or prescribes the acquisition that is to be performed, including inputting parameters pertaining to the field of view as well as the orientation of the desired image or images. In general, it is desirable for the operator to be able to optimally perform the prescription such that the prescribed image accurately encompasses the region of interest. It is undesirable for the prescribed image not to include all the structure that is of interest to the operator. However, if the prescription is performed such that the prescribed region is too large, then the resolution with which information is acquired for the region of interest is unnecessarily reduced.

BRIEF SUMMARY OF THE INVENTION

In order to provide an improved method of defining a three-dimensional imaging section, one embodiment of the invention provides a method which comprises displaying a plurality of localizer images of the structure of interest, acquiring operator inputs that designate regions on the plurality of localizer images and that correspond to regions within the structure of interest, and determining a volume based on the regions designated by the operator inputs. The volume defines the three-dimensional imaging section, which is a three-dimensional section of a structure of interest.

Another embodiment of the invention provides an imaging system comprises a graphic prescription interface and a processor. The graphic prescription interface includes a plurality of localizer images and a plurality of prescription marks. The plurality of prescription marks are displayed on the plurality of localizer images in response to operator inputs. The prescription marks include first, second, third and fourth prescription marks that correspond to respective points within a structure of interest. Each of the first, second, third and fourth prescription marks are displayed on a particular one of the plurality of localizer images that is selected to be indicative of a first coordinate of a respective point, and each of the first, second, third and fourth prescription marks is displayed on the selected localizer image at a location that is indicative of second and third coordinates of the respective point. The processor is coupled to receive information pertaining to the first, second and third coordinates for each of the respective points corresponding to the first, second, third and fourth prescription marks, and is adapted to use the information to determine a volume that defines a three-dimensional imaging section which encompasses the respective points corresponding to the first, second, third and fourth prescription marks.

DETAILED DESCRIPTION OF THE INVENTION

Figure 1:
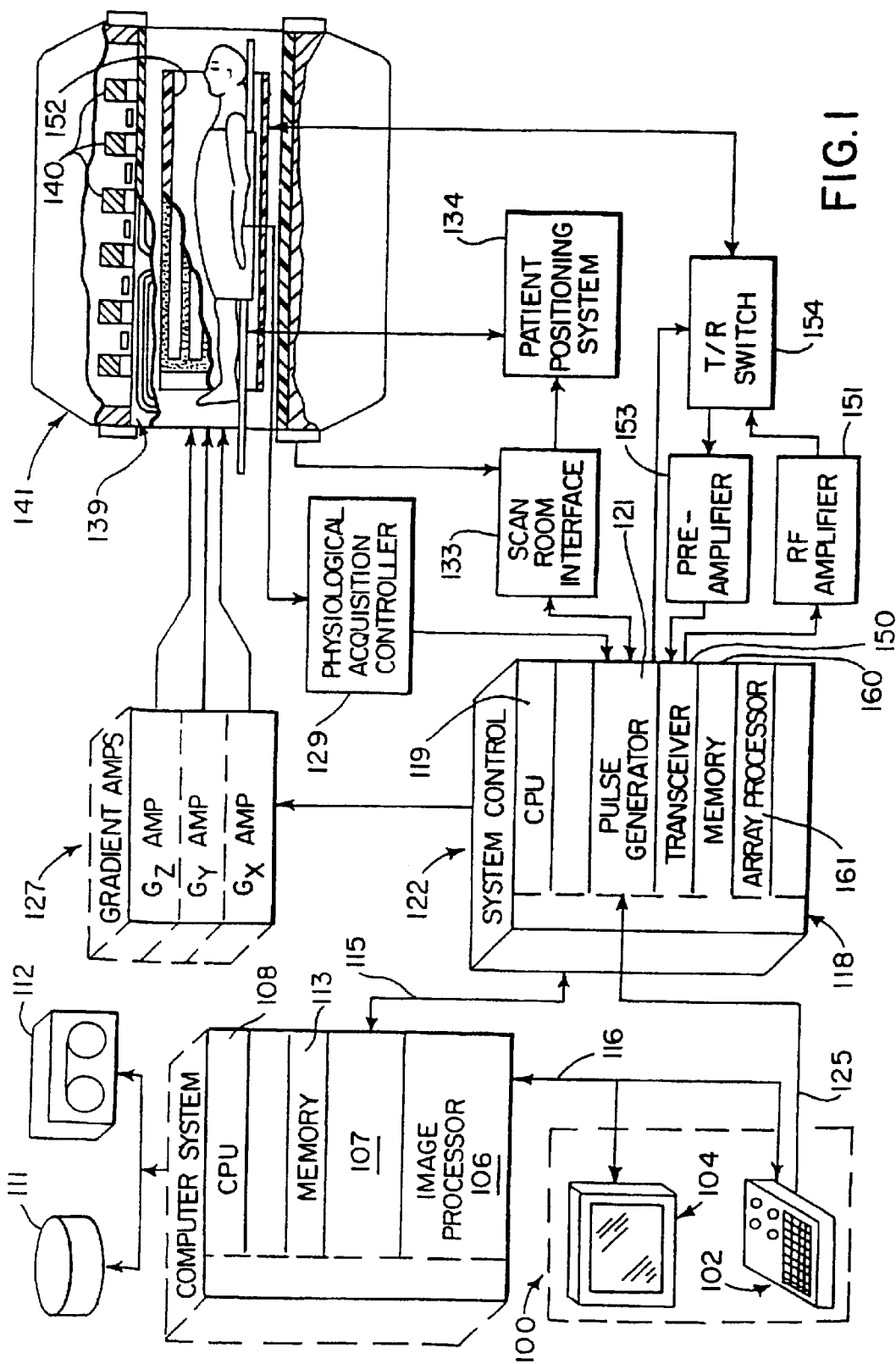
FIG. 1 is a block diagram of an MRI system which employs an embodiment of the present invention.

Referring first to FIG. 1, there is shown the major components of a preferred MRI system which incorporates a preferred embodiment of the present invention. The operation of the system is controlled from an operator console 100 which includes a control panel 102 and a display 104. The control panel 102 includes one or more operator input devices such as a keyboard, mouse, trackball, joystick, light wand, touch sensitive area of the display 104, voice control device, and/or other input devices. The console 100 communicates through a link 116 with a separate computer system 107 that enables an operator to control the production and display of images on the screen 104. The computer system 107 includes a number of modules which communicate with each other through a backplane. These include an image processor module 106, a CPU module 108 and a memory module 113, known in the art as a frame buffer for storing image data arrays. The computer system 107 is linked to a disk storage device 111 and a non-volatile (e.g., optical) storage device 112 for storage of image data and programs, and it communicates with a separate system control 122 through a high speed serial link 115.

The system control 122 includes a set of modules connected together by a backplane. These include a CPU module 119 and a pulse generator module 121 which connects to the operator console 100 through a serial link 125. It is through this link 125 that the system control 122 receives commands from the operator which indicate the scan sequence that is to be performed. The pulse generator module 121 operates the system components to carry out the desired scan sequence. It produces data which indicates the timing, strength and shape of the RF pulses which are to be produced, and the timing of and length of the data acquisition window. The pulse generator module 121 connects to a set of gradient amplifiers 127, to indicate the timing and shape of the gradient pulses to be produced during the scan. The pulse generator module 121 also receives patient data from a physiological acquisition controller 129 that receives signals from a number of different sensors connected to the patient, such as ECG signals from electrodes or respiratory signals from a bellows. And finally, the pulse generator module 121 connects to a scan room interface circuit 133 which receives signals from various sensors associated with the condition of the patient and the magnet system. It is also through the scan room interface circuit 133 that a patient positioning system 134 receives commands to move the patient to the desired position for the scan.

The gradient waveforms produced by the pulse generator module 121 are applied to a gradient amplifier system 127 comprised of $G_x$, $G_y$ and $G_z$ amplifiers. Each gradient amplifier excites a corresponding gradient coil in an assembly generally designated 139 to produce the magnetic field gradients used for position encoding acquired signals. The gradient coil assembly 139 forms part of a magnet assembly 141 which includes a polarizing magnet 140 and an RF coil 152. A transceiver module 150 in the system control 122 produces pulses which are amplified by an RF amplifier 151 and coupled to the RF coil 152 by a transmit/receive switch 154. The resulting signals radiated by the excited nuclei in the patient may be sensed by the same RF coil 152 and coupled through the transmit/receive switch 154 to a preamplifier 153. The amplified MRI signals are demodulated, filtered, and digitized in the receiver section of the transceiver 150. The transmit/receive switch 154 is controlled by a signal from the pulse generator module 121 to electrically connect the RF amplifier 151 to the coil 152 during the transmit mode and to connect the preamplifier 153 during the receive mode. The transmit/receive switch 154 also enables a separate RF coil (for example, a head coil or surface coil) to be used in either the transmit or receive mode.

The MRI signals picked up by the RF coil 152 are digitized by the transceiver module 150 and transferred to a memory module 160 in the system control 122. When the scan is completed and an entire array of data has been acquired in the memory module 160, an array processor 161 operates to Fourier transform the data into an array of image data. This image data is conveyed through the serial link 115 to the computer system 107 where it is stored in the disk storage device 111. In response to commands received from the operator console 100, this image data may be archived on the storage device 112, or it may be further processed by the image processor 106 and conveyed to the operator console 100 and presented on the display 104.

Figure 2:
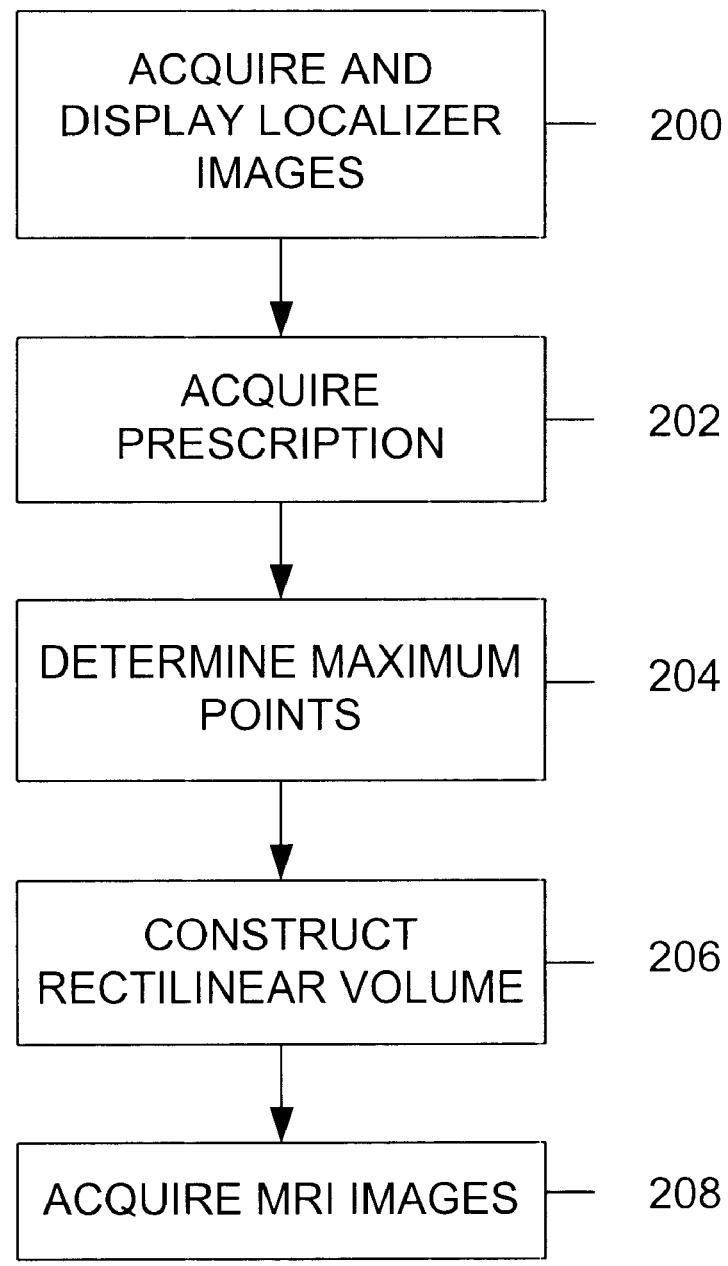
FIG. 2 is a flowchart of a first process for defining a three-dimensional imaging section to be acquired by the MRI system of FIG. 1.

As previously noted, in order for the MRI system to acquire signals from a region of interest to an operator, the operator first defines or prescribes the acquisition that is to be performed. Referring now to FIG. 2, a first process for defining a three-dimensional imaging section is shown. In the process of FIG. 2, an orthogonal rectangular volume is defined that encompasses a plurality of operator-prescribed coordinate points in a structure of interest.

In particular, at step 200, the MRI system first acquires and displays a plurality of localizer images. At step 202, the system acquires operator inputs that are used to define the three-dimensional imaging section.

Figure 3:
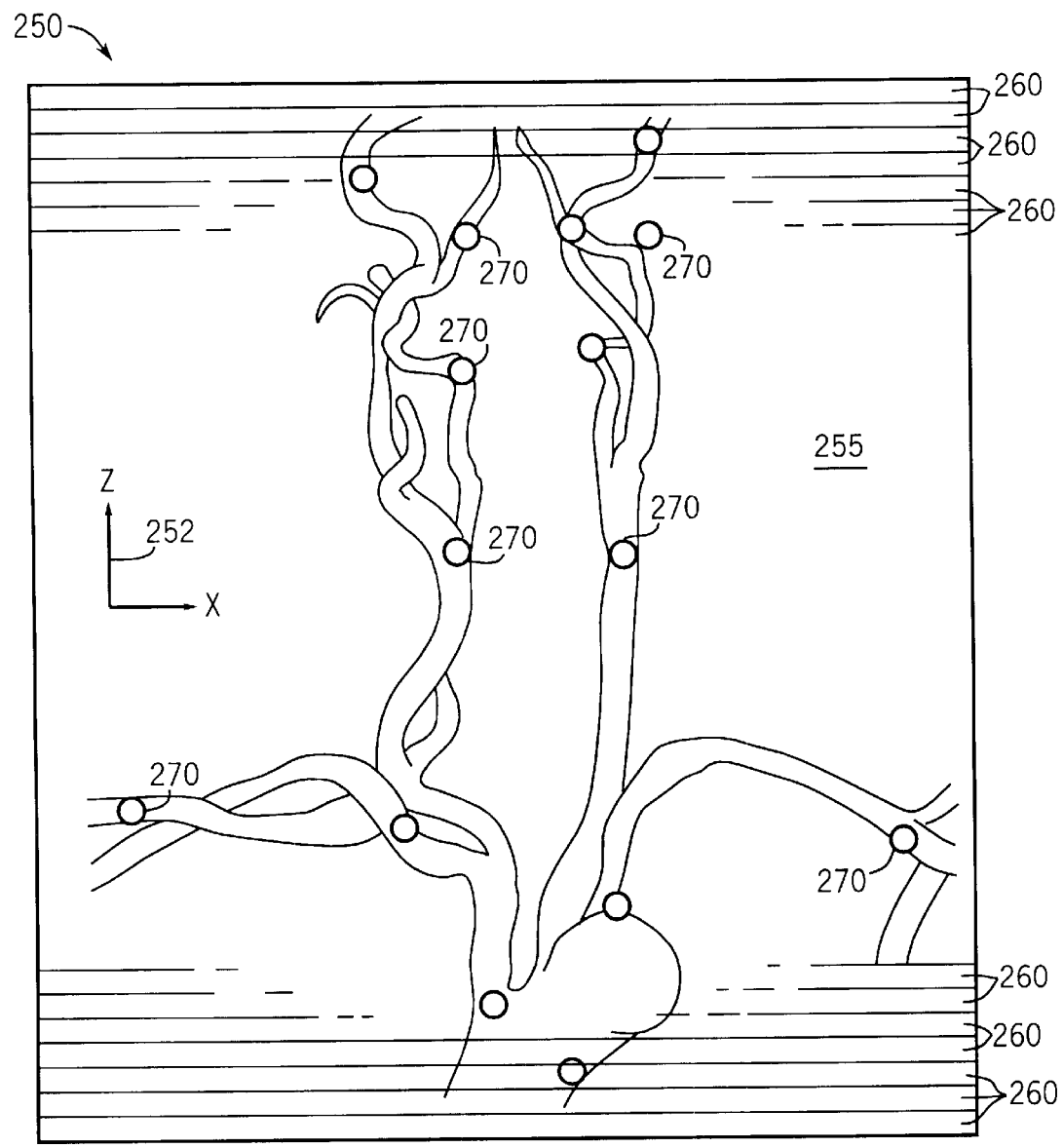
FIG. 3 is a first graphic prescription interface that is usable in connection with the process of FIG. 2.

Steps 200–202 are described in greater detail in connection with FIG. 3. Referring now to FIG. 3, FIG. 3 illustrates a graphic prescription interface 250 that is used to acquire a prescription from an operator for imaging a structure of interest 255. The structure of interest 255 may, for example, be a portion of a human chest cavity that includes particular organs or blood vessels, a patient's head or limbs, or some other structure.

The prescription interface 250 comprises a plurality of adjacent localizer images 260 disposed along a common axis 252 which, in FIG. 3, is the Z axis. For example, there may be forty localizer images disposed along the Z axis. In FIG. 3, the localizer images 260 shown are the localizer images that are acquired in step 200 of FIG. 2. (In FIG. 3, only the localizer images 260 near the top and bottom are specifically shown, with the depiction of specific localizer images quickly fading as the center portion of FIG. 3 is reached.) The localizer images 260 each comprise an image slice that is oriented in the (X, Y) plane and thus that is orthogonal to the Z axis. FIG. 3 is therefore a two-dimensional (X, Z) representation of an orthogonal set of two-dimensional (X, Y) localizer images.

In practice, the localizer images 260 are preferably acquired and displayed to the operator one at a time. The localizer images 260 are displayed using the display 104, with the particular localizer image 260 that is displayed being determined based on operator inputs acquired using the control panel 102. From the operator's perspective, the prescription interface 250 permits the operator to maneuver a two-dimensional scan plane through the structure of interest. Such maneuvering is accomplished by sequentially displaying different localizer images 260 in accordance with operator inputs. Thus, for example, as the operator maneuvers the scan plane from the bottom of FIG. 3 to the top of FIG. 3, different localizer images 260 are displayed such that the operator perceives that the scan plane is moving through the structure of interest 255 under operator control. If desired, the operator may be given the ability to maneuver in both forward and reverse directions along the pertinent axis. Preferably, the localizer images 260 are acquired and displayed in real-time, such that the image slices in FIG. 3 are updated as the operator moves through the structure of interest 255. Thus, although steps 200 and 202 are shown as two sequential steps, these steps are preferably performed concurrently. However, a non-real time implementation may also be utilized.

While the operator is given the perception of maneuvering through the structure of interest 255, operator inputs are acquired that prescribe spatial information on the plurality of localizer images 260. In one embodiment, the prescribed spatial information pertains to (X, Y, Z) coordinate points that are located within the structure of interest 255. In this case, the graphic prescription interface 250 includes prescription marks 270 that correspond to the prescribed spatial information and that are displayed on the localizer images 260. Each prescription mark 270 is displayed on a selected localizer image 260 that is indicative of the Z-coordinate of the coordinate point represented by the prescription mark, and is displayed on the selected localizer image at a location that is indicative of the X and Y coordinates of the coordinate point represented by the prescription mark. Other arrangements may also be used for determining the manner in which particular coordinate points within the structure of interest 255 are represented. In FIG. 3, by way of example, fifteen such prescription marks 270 have been shown. The prescription marks 270 may be chosen to have the appearance of a point, as in FIG. 3, or another suitable appearance may be chosen. The (X, Y, Z) coordinates may be defined with reference to a patient reference frame or with reference to another suitable reference frame.

From the operator's perspective, the operator perceives placing the prescription marks 270 on the structure of interest as the operator maneuvers the two-dimensional scan plane through the structure of interest. At a given instant in the maneuvering process, a particular localizer image 260 is displayed and the displayed localizer image 260 determines the Z-coordinate of any prescription marks 270 that are placed at this instant. The X and Y coordinates of a particular prescription mark 270 depend on operator inputs that are acquired by the control panel 102. The operator inputs may be determined by, for example, where the operator's mouse pointer is located when the operator clicks a mouse button to place a new prescription mark 270. Other arrangements may also be used for determining the manner in which operator inputs designate particular points on the localizer images 260.

An advantage of the prescription interface 250 of FIG. 3 is that it utilizes a "time-of-flight" effect when the structure of interest includes blood vessels. As shown in FIG. 3, the localizer images 260 lie in a plane that is substantially orthogonally oriented relative to the direction of blood flow through the blood vessels shown in FIG. 3. Due to the nature of MRI imaging, the repeated excitation of a substance with RF energy results in saturation that has a deleterious effect on the quality of image data that can be obtained. However, because the localizer images 260 are orthogonally oriented relative to the direction of blood flow, fresh blood is continually flowing during the acquisition of a given localizer image 260. This enhances the image quality that can be obtained for the localizer images 260.

Figure 4:
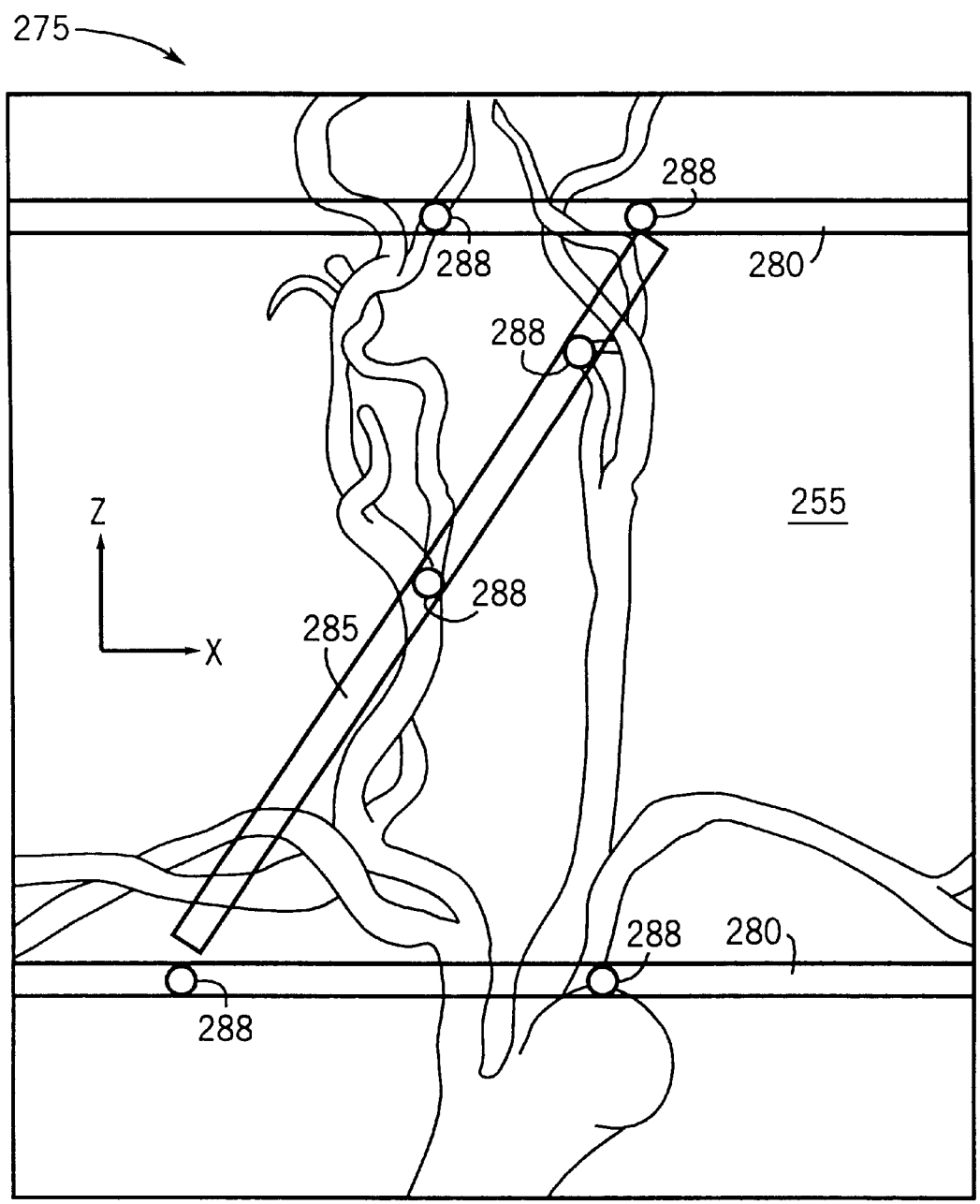
FIG. 4 is a second graphic prescription interface that is usable in connection with the process of FIG. 2.

On the other hand, alternative arrangements may be used in some applications to achieve other beneficial effects. Referring now to FIG. 4, an alternative graphic prescription interface 275 is illustrated. The graphic prescription interface 275 comprises first and second axial localizer images 280 and an oblique sagittal localizer image 285. The localizer images 280 are spaced at opposite ends of the structure of interest but are both orthogonally oriented relative to the Z-axis. The localizer image 285 extends between the localizer images 280.

Figure 5:
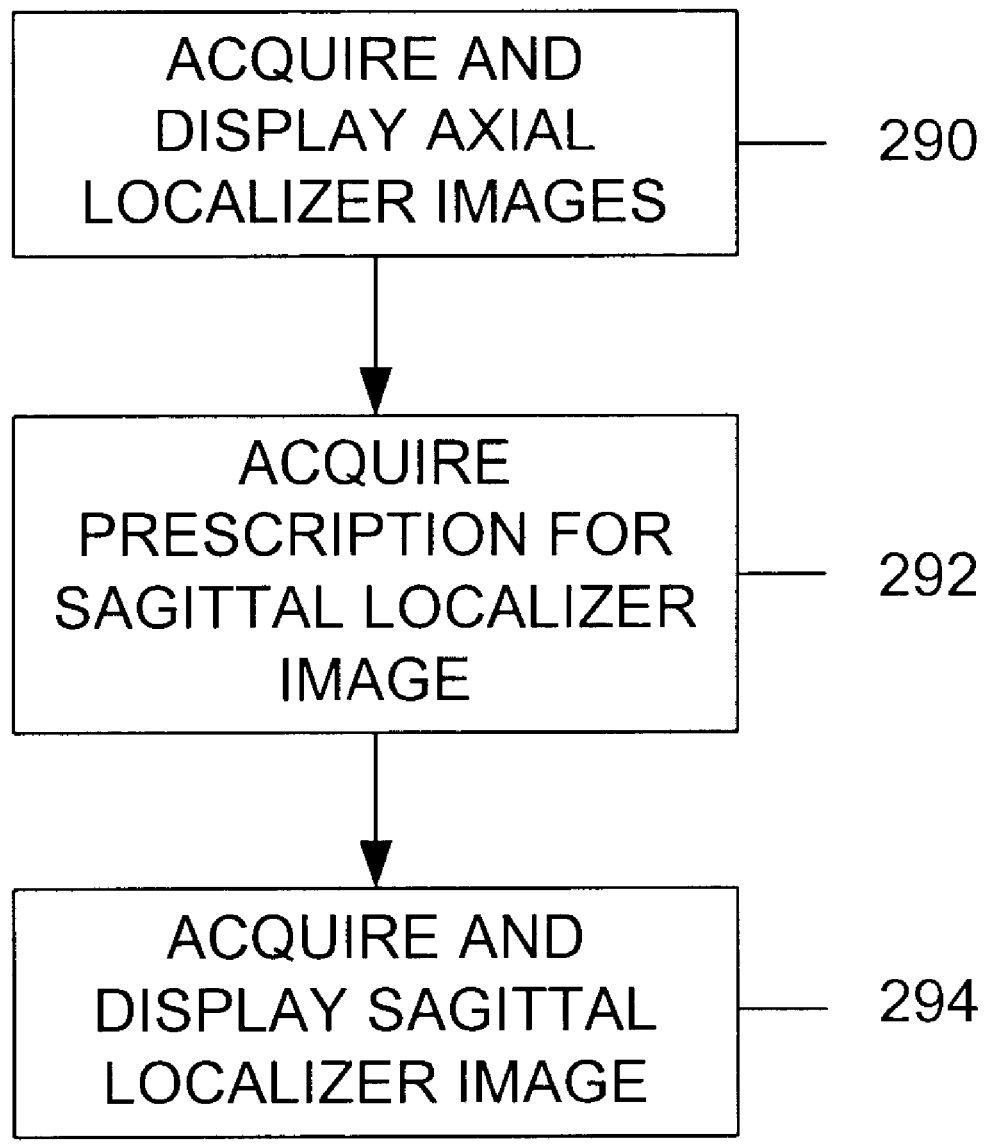
FIG. 5 is a flowchart of a process for acquiring localizer images for the graphic prescription interface of FIG. 4.

FIG. 5 shows a process to acquire the localizer images for the graphic prescription interface 275. First, at step 290, the axial localizer images 280 are acquired and displayed. At step 292, operator inputs are acquired that prescribe the sagittal localizer image 285. In practice, assuming the same arrangement as has been described above is utilized, then operator inputs are acquired that designate a first point on one of the localizer images 280 and a second point on the other of the localizer images 280. The line that connects the first and second points then defines the oblique sagittal localizer image 285, which is then acquired and displayed at step 294.

Operator inputs may be acquired that designate points on the localizer images 280 and 285 in the manner previously discussed. Operator inputs that place prescription marks 288 on the localizer images 280 may be acquired either before or after the localizer image 285 is acquired. To the extent that the number of localizer images is reduced, the ability of the operator to view the structure of interest 255 and designate coordinate points located therein in this embodiment is reduced to the extent that the number of localizer images is reduced. On the other hand, one advantage of the arrangement shown in FIG. 4 as compared to that shown in FIG. 3 is that, because a smaller number of localizer images is acquired (at least in the illustrated embodiment), the complete set of localizer images can be acquired more quickly. The arrangement of FIG. 4 is particularly advantageous in certain medical imaging applications. For example, an oblique sagittal image may be prescribed between the abdominal aorta and the right common femoral artery, and then a thick slab phase contrast image along this plane may be obtained that depicts the inferior abdominal aorta, iliac and proximal femoral vessels in the sagittal plane without severe saturation effects.

Referring back to FIG. 2, after the operator inputs that designate points on the localizer images 260 are acquired at step 202, it is determined which of the prescribed coordinate points are maximum coordinate points at step 204. This analysis is performed in the anterior, posterior, superior, inferior, left and right directions in the structure of interest. Depending on the number and location of the coordinate points, a given coordinate point may be a maximum coordinate point in more than one direction. For example, a given coordinate point may be both a maximum anterior coordinate point and a maximum inferior coordinate point. The subset of coordinate points determined at step 204 are then used to define surfaces of an encompassing volume at step 206.

At step 206, an orthogonal rectilinear volume is determined that encompasses the maximum anterior, posterior, superior, inferior, left and right coordinate points. For example, an anterior surface of the volume may be initially defined at the barycenter of the coordinate points and then moved outwardly in the anterior direction until all prescribed coordinate points are located inwardly of the surface. This process may be repeated for each of the six orthogonal sides of the volume. The computations required to perform this analysis may be performed using the computer system 107 or other suitable processor, such as another microprocessor-based device, application specific integrated circuit, digital signal processor, and so on. In practice, the encompassing volume may be defined such that the maximum coordinate points are located on surface portions of the volume or slightly within the interior portion of the volume, e.g., five millimeters inside the volume. Typically, however, it is desirable for the volume to be defined as small as possible for optimum efficiency.

Alternatively, rather than defining an orthogonal rectilinear volume, it is also possible to constrain the volume in only one or two directions and allow oblique orientations in the unconstrained direction. For example, an oblique coronal plane may be defined in which the phase-encoding direction is fixed with respect to the Y-axis but can be rotated about an axis that is parallel to the X-axis and that passes through the barycenter of the prescribed coordinate points. The process described above in connection with step 206 may then be repeated at various angles of rotation in order to determine which orientation yields the smallest acquisition volume.

Assuming that an oblique orientation is allowed, then it may also be desirable to compare the acquisition time required by the proposed oblique orientation as compared to that required by an orthogonal orientation. Although an oblique orientation may require that fewer image slices be acquired, it may also result in a longer repetition time TR required for acquisition, thereby resulting in a longer overall acquisition time. Therefore, any advantages obtained by an oblique orientation might be eliminated due to the increased repetition time TR. As a result, it may be desirable to compare the acquisition times for each orientation by comparing the product of the repetition time TR and the number of image slices to be acquired in each case.

Once the three-dimensional imaging section is defined using the process of FIG. 2, this information is sent to the remainder of the MRI system of FIG. 1. The MRI system then acquires image data for the three-dimensional imaging section at step 208, and maximum intensity projections can thereafter be used to display two-dimensional views of the acquired three-dimensional imaging section to the operator using the display 104.

Figure 6:
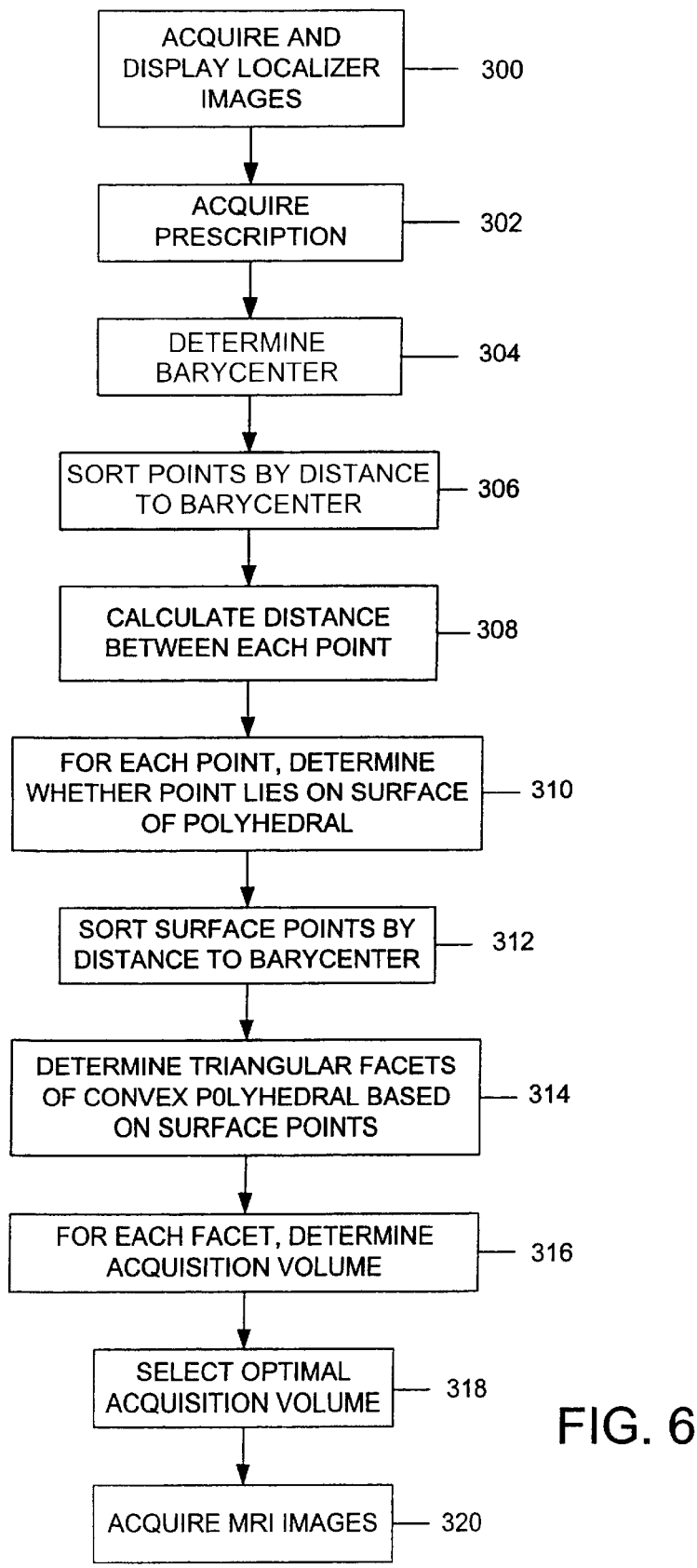
FIG. 6 is a flowchart of a second process for defining a three-dimensional imaging section to be acquired by the MRI system of FIG. 1.

Referring now to FIG. 6, another exemplary process for defining a three-dimensional imaging section is shown. In the process of FIG. 6, a convex polyhedral is defined that encompasses a plurality of operator-prescribed coordinate points. The first two steps are to acquire localizer images (step 300) and acquire a prescription (step 302). Steps 300–302 may be performed in the same manner as described above in connection with steps 200–202 of FIG. 2 (or steps 290–294 of FIG. 5 and step 202 of FIG. 2).

At step 304, the barycenter of the prescribed coordinate points is determined. At step 306, the coordinate points are sorted by distance to the barycenter. For example, a list may be generated in which the coordinate points are listed in the order of furthest points to closest points. At step 308, the distance between each coordinate point is calculated. For example, a table or two-dimensional array may be generated in which the distance from each coordinate point to each other coordinate point is listed.

At step 310, it is determined for each coordinate point whether the coordinate point lies on an outside surface of the convex polyhedral. This step may be performed, for example, by defining a plane at the coordinate point of interest such that the plane has a normal vector that is positioned at the coordinate point of interest and that is directed towards the barycenter. The remaining coordinate points may then be searched to determine if any remaining coordinate points lie outside the plane (in the direction opposite the normal vector). If so, then the coordinate point of interest lies within the polyhedral. If not, the coordinate point of interest lies on the surface of the polyhedral. This process may then be continued until all prescribed coordinate points are determined to be either surface-defining coordinate points or non-surface defining coordinate points. It may be noted that, depending on the volume that is ultimately determined, only some of the surface-defining points of the convex polyhedral will be surface-defining points of the three-dimensional imaging section. Additionally, as previously noted, the surface-defining coordinate points of the three-dimensional imaging section may not ultimately lie on the surface of the three-dimensional imaging section if it is desired to have a tolerance between the prescribed coordinate points and the surface of the three-dimensional imaging section.

Figure 7A:
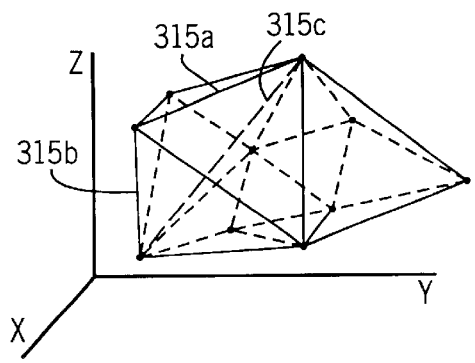
FIGS. 7A–7D show intermediate steps in the process of FIG. 6.

At step 312, once the list of surface-defining coordinate points is generated, the list is sorted by the distance to the barycenter. At step 314, based on the sorted list of surface-defining coordinate points, the triangular facets or surfaces of the convex polyhedral are determined. This step may be performed, for example, in the following manner. For the first coordinate point in the sorted list, the two nearest neighboring non-linear coordinate points are determined. Based on this set of three points, the plane equation for the triangular facet defined by the three points and the normal vector located at the center of the facet are determined and stored. The search of the list of surface-defining points may then continue to determine remaining triangular facets that contain the current point as a vertex. This process is then repeated for all of the surface-defining points, resulting in a convex polyhedral being constructed such as that shown in FIG. 7A. Finally, any triangular facets that extend through the interior of the convex polyhedral are removed. For example, the triangular facet comprising segments 315*a*, 315*b*, and 315*c* in FIG. 7A may be removed because the segment 315*c* extends through the interior of the convex polyhedral.

Figure 7B:
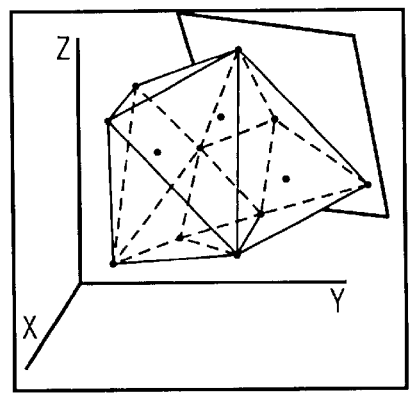
Figure 7C:
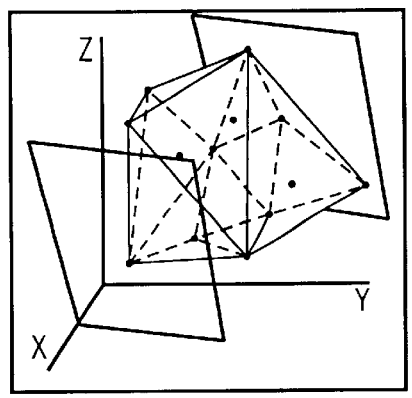
Figure 7D:
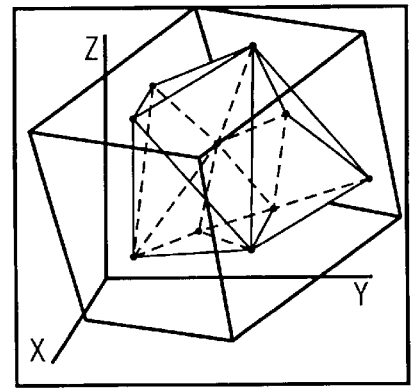

At step 316, a scan volume is determined for each facet of the convex polyhedral. For example, the vector normal to the facet and positioned at its center is determined (FIG. 7B). This vector defines one possible end slice location and orientation for the volume The furthest point from this plane is determined and is used to set the location of the opposite end slice (FIG. 7C). The slab limits in the other two directions are then computed from the set of points, and from this information the acquisition volume is determined (FIG. 7D). This process is then repeated for each facet, such that a set of possible volumes is computed for each facet of the polyhedral. At step 318, the volume that satisfies the desired constraints and conditions is identified (i.e., the thinnest slab defined by the two opposite slices). This volume then defines the three-dimensional imaging section which is then used for MRI image acquisition at step 320.

Figure 8:
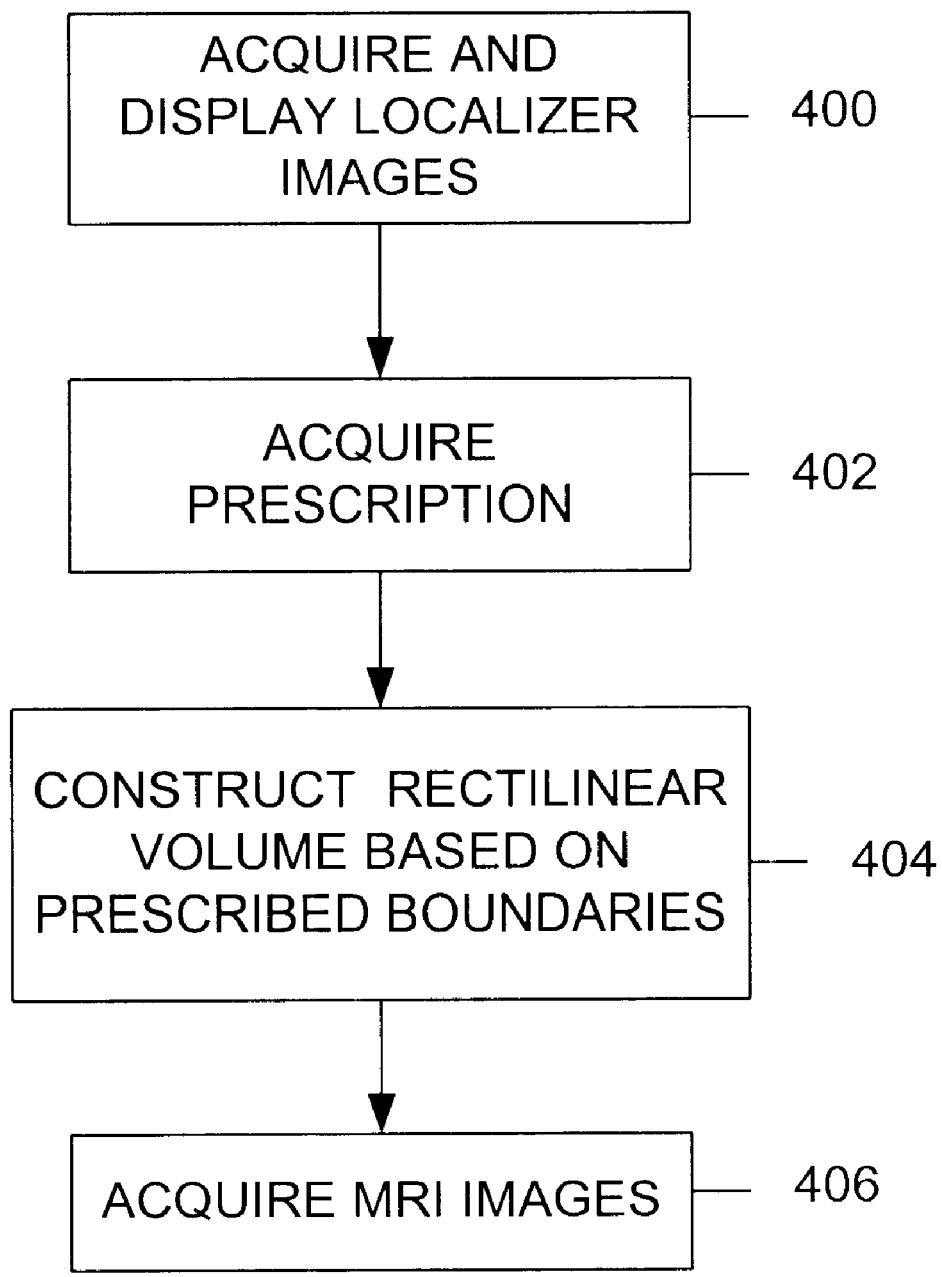
FIG. 8 is a flowchart of a third process for defining a three-dimensional imaging section to be acquired by the MRI system of FIG. 1.

Referring now to FIG. 8, another process for defining a three-dimensional imaging section is illustrated. In the process of FIG. 8, a three-dimensional imaging section is defined based upon operator inputs that prescribe boundaries of the imaging section. The first two steps are to acquire localizer images (step 400) and acquire a prescription (step 402).

Figure 9:
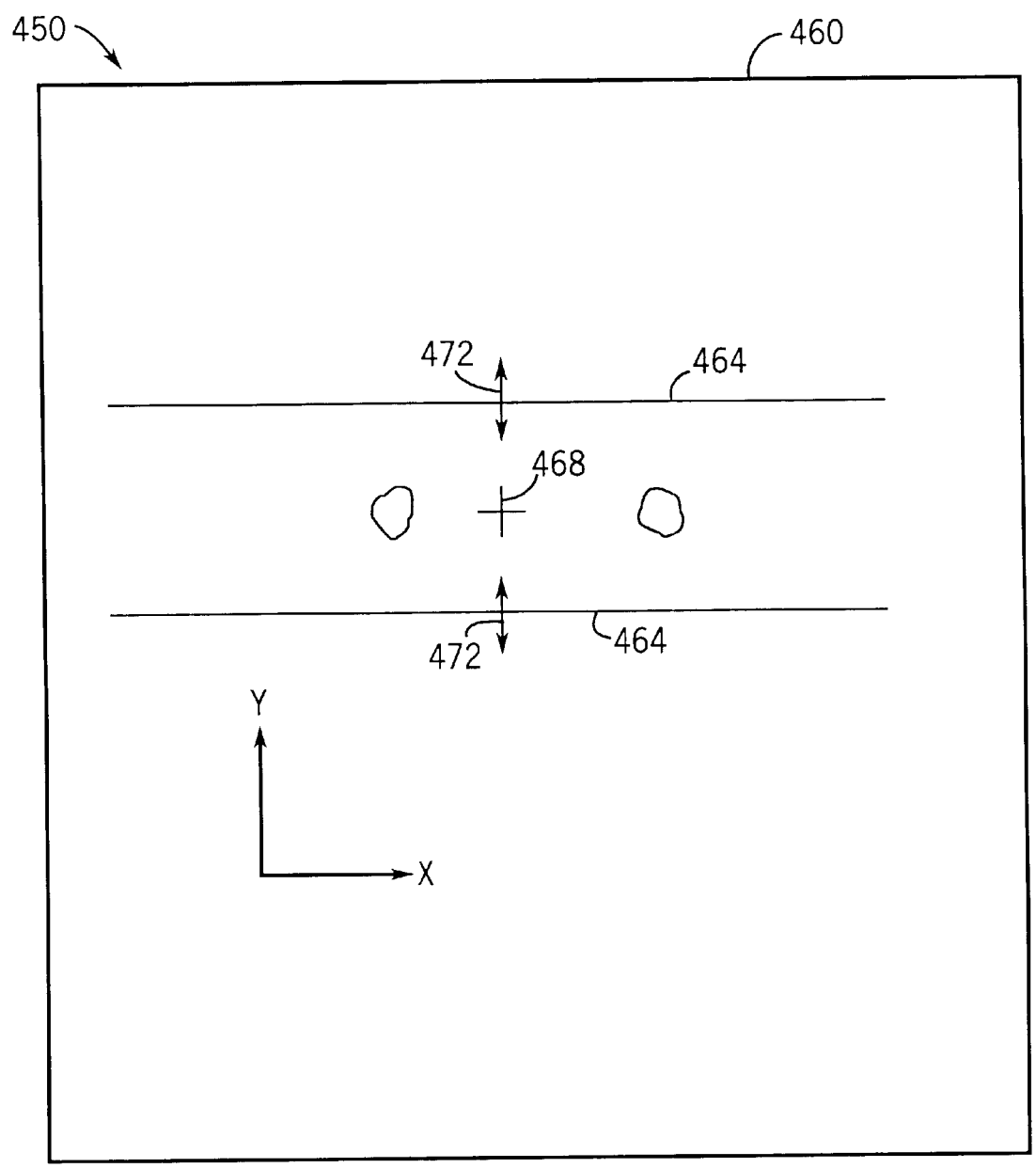
FIG. 9 is a graphic prescription interface usable in connection with the process of FIG. 8.

Steps 400–402 are described in greater in connection with FIG. 9. Referring now to FIG. 9, a third graphic prescription interface 450 is illustrated. The graphic prescription interface 450 of FIG. 9 is similar to the graphic prescription interface 250 of FIG. 3 in that it comprises a plurality of localizer images disposed along a common axis. In FIG. 9, however, it may be noted that a single localizer image 460 is shown, and the localizer image 460 is shown in two dimensions. The localizer image 460 may for example be one of the localizer images 260 of FIG. 3 located in a middle region of the set of localizer images disposed along the Z-axis.

The graphic prescription interface 450 also includes prescription marks 464 which are indicative of the locations the boundaries the three-dimensional imaging section. The prescription marks 464, which are shown as a pair of parallel lines in FIG. 9, are displayed on the localizer image 460 to indicate the anterior and posterior boundaries of the desired volume. The lines 464 may be separated by a maximum distance (image thickness) that is preset by the operator. For example, the maximum distance may be set to the limits of coverage that are possible with the utilized imaging technique. As the operator maneuvers through the structure of interest, the lines 464 are displayed on each image to provide an indication of the boundaries in comparison to the changing anatomy.

Operator inputs may then be acquired that indicate desired changes in the locations of the boundaries indicated by the lines 464. From the operator's perspective, the operator perceives manipulating the boundaries of the three-dimensional imaging section as the operator maneuvers the two-dimensional scan plane through the structure of interest. To this end, a center icon 468 is provided to allow the operator to prescribe anterior and posterior positioning in "click and drag" fashion while maintaining the predetermined coverage in the anterior-posterior direction. The center icon 468 can also be used to provide the operator with an ability to pan/rotate the prescribed three-dimensional imaging section. In addition to the center icon, each line 464 is provided with its own icon 472 which allows the operator to click and drag to reposition each boundary marker independently. Although not shown, a similar arrangement may be provided for defining the left and right boundaries of the volume. For the inferior and superior boundaries (or other directional boundaries, depending on the axis along which the localizer images are acquired) separate provision may be made to allow the operator to select particular localizer images as defining the inferior and superior boundaries of the volume. Once one of the boundaries has been selected, the option to select the other margin may be removed in order to allow the field of view to be fixed.

After the prescription is acquired at step 402, the boundaries prescribed by the operator are used at step 404 to determine a volume that defines the three-dimensional imaging section. At step 406, the MRI system of FIG. 1 then acquires MRI image data in accordance with the prescribed three-dimensional imaging section in the manner previously described.

While the embodiments and application of the invention illustrated in the figures and described above are presently preferred, it should be understood that these embodiments are offered by way of example only. Accordingly, the present invention is not limited to a particular embodiment, but extends to various modifications that nevertheless fall within the scope of the appended claims.

What is claimed is:

1. A method of defining a three-dimensional imaging section, the imaging section being a three-dimensional section of a structure of interest, the method comprising:
   displaying a plurality of localizer images of the structure of interest;
   acquiring operator inputs that designate regions on said plurality of localizer images and that correspond to regions within the structure of interest, said designated regions pertaining to coordinate points that are located within the structure of interest;
   determining a volume based on said regions designated by said operator inputs, said volume defining said three-dimensional section to be imaged; and
   displaying prescription marks on said plurality of localizer images that correspond to said designated regions, each prescription mark being displayed on an image that is selected to be indicative of a first coordinate of a corresponding coordinate point, and each prescription mark being displayed on said selected localizer image at a location that is indicative of second and third coordinates of said corresponding coordinate point.

2. A method according to claim 1, wherein said operator inputs designate first, second, third and fourth points on said plurality of localizer images and respectively correspond to first, second, third and fourth points within the structure of interest.

3. A method according to claim 2, wherein said determining step comprises determining a rectangular volume that encompasses said first, second, third and fourth points in the structure of interest.

4. A method according to claim 3, wherein said rectangular volume has an oblique orientation with respect to at least one of first, second, and third orthogonal imaging planes.

5. A method according to claim 2, wherein, during said acquiring step, a plurality of additional operator inputs are acquired that designate a plurality of additional points on said plurality of localizer images and that correspond to a plurality of additional points within the structure of interest, and wherein said method further comprises
   determining a subset of said first, second, third, and fourth points and said plurality of additional points, said subset of points being surface-defining points of a convex polyhedral that encompasses said first, second, third and fourth points and said plurality of additional points,
   constructing said convex polyhedral using said subset of points.

6. A method according to claim 2, wherein maid method further comprises determining relative distances between said first, second, third and fourth points within the structure of interest.

7. A method according to claim 1,
   wherein said plurality of localizer images comprise first, second, and third localizer images, and
   wherein said first and second localizer images are spaced apart along a common axis, and said third localizer image extends between said first and second localizer images.

8. A method according to claim 7, further comprising
   acquiring said first and second localizer images, then
   acquiring operator inputs that prescribe said third localizer image relative to said first and second localizer images, and then acquiring said third localizer image in accordance with the prescription of said third localizer image.

9. A method according to claim 7, wherein said operator inputs designate first, second, third and fourth points on said plurality of localizer images and respectively correspond to first, second, third and fourth points within the structure of interest, and wherein said determining step comprises determining a rectangular volume that encompasses said first, second, third and fourth points in the structure of interest.

10. A method according to claim 1, wherein each of said plurality of localizer images is acquired and displayed in real-time.

11. A method according to claim 1, wherein the structure of interest includes at least a portion of a blood vessel, and wherein at least some of said plurality of localizer images lie in a plane that is substantially orthogonally oriented relative to a direction of blood flow through the portion of the blood vessel.

12. A method according to claim 1, further comprising acquiring said plurality of localizer images using a magnetic resonance imaging system, and wherein said three-dimensional section to be imaged is an section to be acquired by said magnetic resonance imaging system.

13. The method of claim 1, wherein determining a volume based on said regions designated by said operator inputs comprises using coordinates of said regions designated by said operator inputs to determine the volume.

14. A method of defining a three-dimensional imaging section, the imaging section being a three-dimensional section of a structure of interest, the method comprising:
    displaying a plurality of localizer images of the structure of interest to an operator, said plurality of localizer images being adjacent images acquired along a common axis, said plurality of localizer images being displayed sequentially in accordance with operator inputs, such that the operator perceives maneuvering a two-dimensional scan plane through the structure of interest;
    acquiring operator inputs that prescribe spatial information on said plurality of localizer images, said prescribed spatial information pertaining to coordinate points that are located within the structure of interest;
    determining a volume based on said spatial information prescribed on said plurality of localizer images, said volume defining a three-dimensional section to be imaged; and
    displaying prescription marks on said plurality of localizer images that correspond to said prescribed spatial information, each prescription mark being displayed on an image that is selected to be indicative of a first coordinate of a corresponding coordinate point, and each prescription mark being displayed on said selected localizer image at a location that is indicative of a second and third coordinates of said corresponding coordinate point.

15. A method according to claim 14, wherein said localizer image displaying step and said prescription mark displaying step are performed such that the operator perceives placing said prescription marks on the structure of interest as the operator maneuvers said two-dimensional scan plane through the structure of interest.

16. A method according to claim 14, wherein said coordinates points include first, second, third and fourth coordinate points, and wherein said method further comprises computing distances between each of said first, second, third and fourth coordinate points and each remaining one of said first, second, third and fourth coordinate points.

17. A method according to claim 14, wherein said coordinates points include first, second, third and fourth coordinate points and a plurality of additional coordinate points, and wherein said method further comprises determining a subset of said points that are surface-defining points of said three-dimensional section to be imaged.

18. A method according to claim 14, wherein said coordinates points include first, second, third and fourth coordinate points and a plurality of additional coordinate points, and wherein said method further comprises constructing a convex polyhedral that encompasses said first, second, third and fourth coordinate points and said plurality of additional coordinate points.

19. A method according to claim 14, wherein said method further comprises determining a barycenter of said coordinate points.

20. A method according to claim 14, wherein each of said plurality of localizer images is acquired and displayed in real-time.

21. A method according to claim 14, further comprising acquiring said plurality of localizer images using a magnetic resonance imaging system, and wherein said three-dimensional section to be imaged is an section to be acquired by said magnetic resonance imaging system.

22. The method of claim 14, wherein determining a volume based on said spatial information prescribed on said plurality of localizer images comprises using coordinates of said spatial information prescribed on said plurality of localizer images.

23. A method of defining a three-dimensional imaging section, the imaging section being a three-dimensional section of a structure of interest, the method comprising:
    displaying a plurality of localizer images of the structure of interest to an operator, said plurality of localizer images being adjacent images acquired along a common axis, said plurality of localizer images being displayed sequentially in accordance with operator inputs, such that the operator perceives maneuvering a two-dimensional scan plane through the structure of interest;
    acquiring operator inputs that prescribe spatial information on said plurality of localizer images, said prescribed spatial information pertaining to boundaries of said three-dimensional section to be imaged;
    determining a volume based on said spatial information prescribed on said plurality of localizer images, said volume defining a three-dimensional section to be imaged; and
    displaying prescription marks on said plurality of localizer images, said prescription marks being indicative of locations of said boundaries of said three-dimensional section to be imaged;
    wherein said acquiring step comprises acquiring operator inputs that indicate desired changes in said locations of said boundaries of said three-dimensional section to be imaged.

24. A method according to claim 23, wherein said localizer image displaying step and said prescription mark displaying step are performed such that the operator perceives manipulating said boundaries of said three-dimensional section to be imaged.

25. An imaging system comprising:
    a graphic prescription interface including
        a plurality of localizer images;
        a plurality of prescription marks, said plurality of prescription marks being displayed on said plurality of localizer images in response to operator inputs, said prescription marks including first, second, third and fourth prescription marks that correspond to respective points within a structure of interest, each of said first, second, third and fourth prescription marks being displayed on a particular one of said plurality of localizer images that is selected to be indicative of a first coordinate of said respective point, and each of said first, second, third and fourth prescription marks being displayed on said selected localizer image at a location that is indicative of second and third coordinates of said respective point;

a processor, said processor being coupled to receive information pertaining to said first, second and third coordinates for each of said respective points corresponding to said first, second, third and fourth prescription marks, and said processor being adapted to use said information to determine a volume that defines a three-dimensional section to be imaged which encompasses said respective points corresponding to said first, second, third and fourth prescription marks.

26. A system according to claim 25, further comprising a gradient amplifier system including first, second and third amplifiers, and first, second and third orthogonal gradient coils, said first, second and third amplifiers being respectively coupled to said first, second and third gradient coils to produce magnetic field gradients usable for position encoding acquired signals.

27. A system according to claim 25, wherein the structure of interest includes at least a portion of a blood vessel, and wherein at least some of said plurality of localizer images lie in a plane that is substantially orthogonally oriented relative to a direction of blood flow through the portion of the blood vessel.

28. An imaging system comprising:

means for acquiring operator inputs that prescribe spatial information on a plurality of localizer images, said plurality of localizer images being images of a structure of interest, means for displaying said plurality of localizer images along with said prescribed spatial information; and means for determining a volume based on said spatial information prescribed on plurality of localizer images, said volume defining a three-dimensional section to be imaged wherein said prescribed spatial information pertains to coordinate points that are located within the structure of interest;

wherein said plurality of localizer images are adjacent images acquired along a common axis;

wherein said means for displaying displays said prescribed spatial information in the form of prescription marks displayed on said plurality of localizer images, each prescription mark being displayed on an image that is selected to be indicative of a first coordinate of a corresponding coordinate point, and each prescription mark being displayed on said selected localizer image at a location that is indicative of second and third coordinates of said corresponding coordinate point; and wherein said means for determining includes means for determining relative distances between said coordinate points and means for determining, based on said relative distances, a subset of said coordinate points that are surface-defining points of said three-dimensional section to be imaged.

29. An imaging system according to claim 28, wherein said plurality of localizer images comprise first, second, and third localizer images, and wherein said first and second localizer images are spaced apart along a common axis, and said third localizer image extends between said first and second localizer images.

* * * * *